Patented June 18, 1929

1,717,797

UNITED STATES PATENT OFFICE.

ROBERT A. MARR, OF NORFOLK, VIRGINIA.

PROCESS OF PRODUCING PULP.

No Drawing. Application filed March 28, 1924, Serial No. 702,688. Renewed March 15, 1929.

In my copending application 407,759, filed September 2, 1920, I have described a process of producing pulp from various woods, including porous woods, non-porous woods, and other vegetable growths such as banana stalk, sedges, swamp grass, bear grass, salt marsh grasses, cocoanut husks, straw and the like, the aid process consisting in boiling the wood or other material with a solution of iron sulfate, copper sulfate or various other sulfates, the boiling being continued until the cementitious matter in the wood has been rendered readily friable, but not until the same has been dissolved. After this the treated vegetable material is removed from the cooking liquor and is reduced to a pulp, in the presence of water, and the pulp can then be worked up into finished products in the well known manner.

In a later copending application 595,215, filed October 17, 1922, reference is made particularly to the use of sulfates of the alkali-forming metals, particularly sodium sulfate, potassium sulfate, magnesium sulfate, and special reference being made therein to the use of cane, although it is to be understood that the process is also applicable to the treatment of woods as above referred to and other forms of vegetable growth.

In another copending application 616,609, filed February 2, 1923, I have also referred to the use of sodium sulfate, magnesium sulfate, aluminum sulfate and other sulfates, for the production of pulp and fiber products, from all kinds of vegetable material.

In another copending application 616,610, filed February 2, 1923, I have referred particularly to the use of kainit, as the chemical to be used in reducing vegetable growth in accordance with the procedure above described.

I have now found that various other salts can be used in a somewhat similar manner, and particularly the salts of the alkali-forming metals, sodium, potassium, magnesium and the like, those salts which do not have any reducing (i. e. deoxidizing) action being found to be particularly suitable, and of such salts I mention, sodium nitrate and especially sodium chloride. It will be understood that the nitrates and chlorides of the other alkali-forming metals can also be used. For commercial reasons, sodium chloride is preferred, this being an extremely cheap substance, available everywhere, and I call attention to the fact that the salt used does not have to be of a high degree of purity, in fact the crudest forms of sodium chloride, such as rock salt, salt obtained by the evaporation of sea water, and the like, being entirely suitable, and giving very satisfactory results. Also sea water in its natural state or reinforced with a small additional amount of common salt can be employed.

In this connection it may be called to attention that sea water which may be considered as a solution of highly impure sodium chlorid, is far better, for the cooking operation, than a solution of purified salt, such as table salt. Ordinary sea water contains about 3% of actual sodium chlorid, together with smaller amounts of chlorids and sulfates of magnesium, potassium and calcium, these impurities amounting to about one-fourth as much as the content of sodium chlorid. Hereinafter, the term "sodium chlorid" will be used in its chemical sense and the term "common salt" used to designate a more or less impure article, and the term "sea salt" is used to designate mixtures containing some at least of the common impurities of sea water.

When using common salt and sea salt, it is of importance that the strength of the solution should be properly maintained, and I find that solutions between 3 and 3½% strength seem to give the best results, although solutions between 2% and 5% can be satisfactorily employed.

The length of time of the cooking operation and the temperature of the cooking operation are also of very substantial importance. The temperature is easily controlled by controlling the pressure and most satisfactory results are secured when the pressure is maintained at between about 80 and 110 lbs., per square inch, this amount of pressure being maintained for about 1 to 3 hours. The temperature should preferably not be allowed to go up to a temperature corresponding to a pressure of 120 lbs., at any time, during the cooking, and in any event should not be allowed to go substantially above this point as the material is liable to become injured.

In a preferred form of execution of the process, the wood or other material to be digested, is placed in a digester, which may be made of cast iron or steel, and which does not require any lining of tile, bricks or similar material, and the wood can, if desired, be enclosed in a cage made of coarse wire screening or equivalent material. The wood can if desired, be in the form of chips, such as are commonly used in making pulp, although if desired, very much larger chips can be satisfactorily used. Very satisfying results have been secured when using pieces of wood, say about 3 inches long (in the direction of the grain, and half inch or up to an inch square). Other sizes can of course be employed. The digester having been filled with the wood or other material, a solution of common salt, say containing about 3 to 3½% strength is then run in, the digester closed and the material is then heated, for instance by blowing in superheated steam, until the pressure is raised to about 80 or 85 lbs., per square inch, which pressure is maintained for about say 3 to 4 hours, after which the solution is blown off and the treated wood removed from the digester, and placed in cold water, in which it is allowed to soak for awhile, say for one to two hours or more. The pieces may, if desired, be then run through a splitting machine and are then run between heavy rollers or are mashed up in a mill such as an edge runner, and the material then run through an ordinary pulper, with water, and then run into a beater. The beating operation may be started with the roll raised, say five or six turns above the bed, and the roll can be gradually or rapidly lowered during the beating operation, say down to about three or four turns above the bed. This beating operation does not have to be continued for a very long period, a beating for only fifteen or twenty minutes gives very satisfactory results. After this beating, the material can if desired be subjected to a light wash, to remove a substantial part of the cementitious matter, which has now been broken up into the form of a fine powder. The material can again be put back into the beater, and beaten for say another half hour, more or less, after which the material can be run onto a paper machine, or if desired, before being run onto the paper machine, any desired amount of sizing and size precipitant (such as rosin size and aluminum sulfate) can be added.

If the pressure in the cooking operation is maintained somewhat higher, say up to 100 or 110 lbs., per square inch, the time of cooking can be substantially reduced, thus I find that a pressure of 110 lbs., maintained for about 1½ hours to 2½ hours gives very satisfactory results.

In most cases it is advisable to also add small amounts of sulphate or other salt, including those above referred to, to the cooking liquor, although generally this is not necessary.

I call attention to the fact that the cooking liquor in the present case can be used over a considerable number of times, without losing its efficiency, and it is desirable, say after every third or fourth cook, to make a test of the liquor and to add a small amount of salt (e. g. sea salt) thereto, if it is found that the solution has lost in strength, during the cooking operation. During the cooking operation the liquor acquires a somewhat yellowish color and an odor resembling caramel or burnt sugar. The strength of the solution and the time of cooking should be regulated so as to produce this caramel odor, as otherwise the results will be far less satisfactory.

The sheeted product produced by this process, will be of a buff to brownish color, depending upon the particular wood being treated, or other material being treated. Spruce and similar woods are found to produce a light buff paper very suitable for wrapping paper, and having a very high strength, resembling kraft paper. I call attention to the fact that even with the very small amount of beating above referred to the product is free from shives, and particularly after a small amount of size and alum has been added, the material works very free on the screens of the paper machine.

The following examples are given, showing procedure falling within the scope of the present invention, but it is to be understood that the said examples are given in an illustrative and not a restrictive sense.

*Example 1.*—A solution of salt was prepared, containing about 3.5% of sodium chloride, and small amounts of the other salts above referred to, the said solution being prepared by adding a small amount of ordinary table salt, to sea water. Large chips of Adirondack spruce, yellow poplar, and also spruce in the form of standard chips (the latter containing about 40% of moisture) and the large spruce chips being in a substantially air-dry state, were placed in the digester and the above solution was then run in to completely cover the same. The temperature was then raised (by external heating) until a pressure of about 110 lbs., per square inch, was registered on the pressure gage of the digester. This pressure was maintained for about 1½ hours, at which time the heat was shut off, the digester allowed to cool somewhat, and the cage carrying the wood was then removed from the solution and placed in a tank of water, in which it was left over night. The following day, portions of each of the materials above referred to, were first crushed, then run through a pulper and then run into a beater, in which the beating was conducted with the roll raised about five turns above the bed, at the commencing of the operation, and after a short time the roll was lowered to four turns above the bed. The beating was continued in each case, for forty-five minutes, and a portion of each material was then sheeted. Extremely strong sheets were thereby produced. Another portion of each pulp was then given a light wash, and a portion thereof was sheeted. The sheeted materials so formed, in each case, was found to be of a high strength, and very suitable as a wrapping paper. To other portions of the beaten and washed materials, a little rosin size and alum were added, and the beating continued for another fifteen minutes. These materials were then made into sheets of paper, which were found in all cases to possess good strength and appearance.

The materials produced in this manner from the spruce, whether in the form of large chips of dried spruce or standard size chips of wet spruce, were found to be of a light buff color.

*Example 2.*—The solution remaining from the first cook, was then used for cooking cane, including bamboo and Machrosperma tecta, some of the cane was in a dried state, and some was in a green state. The pressure was raised to 110 lbs., by heating, and this amount of pressure was maintained for about an hour. At the end of this time and after cooling somewhat, the cooked material was removed from the digester and thrown into a tank of water, and allowed to stand overnight. The following day this was run through rollers, was then run, with water, through a pulper, and then into a beater, in which it was beaten half an hour with the roll raise four turns. A portion of the material was then removed from the beater, and was made into a sheet. This gave a strong sheet of a brownish color. Another portion of the same was given a light wash, and was made into a sheet, of a light brown color, which showed a high degree of strength. Another portion of the material was treated with size, the beating continued for another five or ten minutes and then made into a sheet, which produced a light brown, very strong sheet, very suitable for wrapping paper.

*Example 3.*—Large chips of dry spruce wood, wet and dry, black gum wood, red gum wood, dry poplar wood, and also standard sized chips of wet spruce wood, were placed in a solution of sea salt, about 3½% strength, and the material was digested, for 1½ hours at a pressure of about 110 lbs. per square inch. The total time that the material was at a pressure above 90 lbs., amounted to 2 hours.

During this run the pressure was allowed to go up to 120 lbs., for a short period. The material was then worked up as above indicated, and the pulp or sheets produced seem to be somewhat inferior to those produced in the first two examples, probably on account of the fact that the pressure in the digester in the cooking operation, was allowed to run up to 120 lbs.

I call attention to the fact that it is advisable to soak material in cold water for several hours in order to become thoroughly water soaked, before proceeding to the crushing operation. It is not advisable to dry the material in this stage, although in some instances the cooked material can be first dried, and shipped to another plant, and then soaked in water for one or several days, in order to become thoroughly wetted before being crushed. This latter procedure might be advisable in cases where the cooking is to be conducted in one plant and the subsequent operations in another plant. I also call attention to the fact that after the pulping, the material can be sheeted, forming wet or dry laps, which can be shipped to paper product mills located at another place, for being converted into the final product. This latter is preferable, instead of drying the cooked material.

I have above referred to making paper from the pulp produced, and in this operation it is sometimes advisable to wash out a large proportion of the cementitious matter, which has been converted into a pulverulent state, during the crushing and beating steps. It is not necessary, however, in all cases to do this, and in some instances, it may be found advisable to wash out a small part, say half, of the cementitious matter, and this cementitious matter so washed out can be collected as a by-product and worked up into various plastic objects or molded articles.

*Example 4.*—White birch in the form of half inch boards, red birch in the form of 1⅛ inch boards, sawed 1¼ inches long, Glens Falls maple, 1½ x 1½ x 3 inches, pieces of yellow poplar about 9 x 1 x 2 inches, black gum slabs, wet spruce chips, dry white poplar, dry maple slabs, large dry spruce chips about ½ x ½ x 3 inches, green cane in 8 inch lengths, green pine and dry pine, constituted the raw material used in this run. The materials were placed into a coarse wire mesh basket and lowered into a vertical digester, and ocean water of normal concentration was added to completely cover the cage of material. About a gallon of the sea water was used for each two pounds of wood, etc. The digester was then closed and heat applied at the bottom. The pressure was run up to 110 lbs., was held at that point for about 1⅔ hours, the heat shut off and the digester and contents allowed to cool for an hour, the digester was opened and the cage of chips was removed to a tank of fresh cold water, and allowed to soak for an hour or so.

The large chips were split (lengthwise of the grain) into pieces about half inch square, and samples of each of the materials were then crushed, run through a pulper with water, and the pulp beaten with the roll 6 turns up at the beginning and quickly run down one or two turns, the beating was first continued 15 minutes, half of the pulp withdrawn, part of which was given a light wash and sheeted and another part directly sheeted. The remainder (not withdrawn from the beater) was beaten another half hour, a part withdrawn and sheeted, another part was sized with a solution of rosin soap containing a little rubber latex, followed by a small amount of aluminum sulfate solution, and then sheeted.

All of the products were of very excellent quality.

*Example 5.*—Commercial calcium chlorid in the form of a solution of 2¼% strength. Wood used was white birch, oak, white poplar, hickory, black gum and spruce, partly wet and partly dry, and cane. The spruce was in the form of standard size chips, and the other woods in the form of large chips about four inches long, in the direction of the grain, and averaging about half inch square. The cane was cut in lengths of about six inches, part of this was green and part of it was dry. Each kind of wood, etc., was bundled separately, and all put into a wire mesh basket. The calcium chlorid solution was added, to completely submerge the basket containing the material, and the lid of the digester closed and bolted down. Heat was applied until the pressure gauge registered 110 lbs., which was continued about one hour, the heat turned off and the material allowed to cool for two hours in the liquor. The basket of cooked material was then transferred to cold water, and after soaking an hour or more was crushed, pulped, beaten and sheeted as in the above examples. Excellent products were produced.

In some cases it is advisable to employ somewhat stronger or weaker solutions of calcium chlorid, say from about 2 to 4% or even slightly stronger.

In place of using sea salt alone, it is advisable in some cases to use a mixture of this with calcium chlorid, magnesium chlorid. In other cases it is sometimes advisable to add sodium sulfate, magnesium sulfate, alum or other sulfates. These additions may amount to, say 5 to 10% or even more, of the solids content of the sea water.

When it is desired to use rock salt, or other form of common salt for making up the cooking liquor, it is preferable (unless the salt used already contains considerable amounts of calcium and magnesium compounds, or sulfates) to add say $MgCl_2$, $MgSO_4$ kainit, $Na_2SO_4$ or $CaCl_2$, equal to say 5 to 20% of the amount of the common salt. Such mixtures seem to give far better results than the common salt alone.

In connection with the operation of crushing the digested material, before pulping, this step is usually advisable. The chips can be run directly (preferably after soaking in water, for a few hours) from the digester into the pulper or beater (the roll of the latter being preferably raised somewhat more than above indicated) but it is usually more economical to first crush, e. g. in an edge runner, then run with water through the pulper. This crushing and pulping act to shred the material to a considerable extent, and are not to be confused with such an operation as mechanical wood grinding, which latter tears and breaks up the fibres to produce only very short fibred pulp.

In the cooking operation, it is to be understood that the cooking proceeds clear to the center of each chip or piece of wood, or like material and it is regarded as astonishing that such a result can be secured in a short time, such as one hour as mentioned in some of the above examples, and particularly at the low pressures used in this process.

In cooking with common salt and sea salt it is quite essential that the strength of the solution be kept within or substantially within the limits above indicated.

The use of sea water is of course advisable, when mills are to be located close to the salt water, and if desired, sea water can be used for the pulping and for a portion of the washing operation, as well as for the cooking step. It is however, advisable in some cases to use fresh water for the final washing, in order to remove at least a major part of the salt from the final product.

While I have above referred to making paper from this product, it will be obvious that the same can be used for making various other pulp objects, including card-board and various molded pulp articles.

The yield of the pulp is very much higher than with the sulphite and soda processes and "sulfate process" (sulphide process) heretofore largely used in this country for the production of paper pulp, from wood and similar materials. In cases where the cementitious matter is not washed out, I am able to produce, in the form of finished pulp, about 90 to 95% of the dry weight of the original wood or similar material under treatment. Also I call attention to the short time of digestion and the short time of the beating operation.

The wood or other material to be treated in accordance with the present process can be either in a dry state or a green state, or it may be saturated with water, as in the case of logs which have been floated from the forest to the mill. Wood which is in a green state is apparently capable of producing somewhat stronger pulp, than wood which has been thoroughly dried.

I claim:

1. A process of producing pulp which comprises subjecting a cellulosic material to a partial cooking treatment, by digesting the same in a 1 to 5% solution of a normal salt of an alkali-forming-metal, such salt being derived from an acid which is stable at the temperature of the digesting operation, continuing this treatment until the cementitious matter is rendered readily friable, but not until the said material has been reduced to a pulp, the digestion being at a temperature sufficient to produce a caramel odor in the liquid, and thereafter reducing the material to a pulp by mechanical treatment.

2. A process of producing pulp which comprises subjecting a cellulosic material to a partial cooking treatment, by digesting the same in a 1 to 5% solution of a normal salt of an alkali-forming-metal, such salt being derived from an acid which is stable at the temperature of the digesting operation, such salt being substantially without oxidizing or deoxidizing properties, continuing this treatment until the cementitious matter is rendered readily friable, but not until the said material has been reduced to a pulp, the digestion being at a temperature sufficient to produce a caramel odor in the liquid, and thereafter reducing the material to a pulp by mechanical treatment.

3. A process of producing pulp which comprises subjecting a cellulosic material to a partial cooking treatment, by digesting the same in a 1 to 5% solution of a halide of an alkali-forming metal, continuing this treatment until the cementitious matter is rendered readily friable, but not until the said material has been reduced to a pulp, the digestion being at a temperature sufficient to produce a caramel odor in the liquid, and thereafter reducing the material to a pulp by mechanical treatment.

4. A process of producing pulp which comprises subjecting a cellulosic material to a partial cooking treatment, by digesting the same in a 1 to 5% solution of a chlorid of an alkali-forming metal, continuing this treatment until the cementitious matter is rendered friable, but not until the said material has been reduced to a pulp, the digestion being at a temperature sufficient to produce a caramel odor in the liquid, and thereafter reducing the material to a pulp by mechanical treatment.

5. A process of producing pulp which comprises subjecting a cellulosic material to a partial cooking treatment, by digesting the same in a 1 to 5% solution of sodium chlorid, continuing this treatment until the cementitious matter is rendered readily friable, but not until the said material has been reduced to a pulp, the digestion being at a temperature sufficient to produce a caramel odor in the liquid, and thereafter reducing the material to a pulp by mechanical treatment.

6. A process of producing pulp which comprises subjecting a cellulosic material to a partial cooking treatment, by digesting the same in a 3 to 3.5% solution of a normal salt of an alkali-forming metal, such salt being derived from an acid which is stable at the temperature of the digesting operation, continuing this treatment until the cementitious matter is rendered readily friable, but not until the said material has been reduced to a pulp, the digestion being at a temperature sufficient to produce a caramel odor in the liquid, and thereafter reducing the material to a pulp by mechanical treatment.

7. A process which comprises boiling cellulosic and ligneous material in solution of common salt, at about 80 to 100 lb. pressure, soaking the product in cool water and thereafter mechanically reducing the same to pulp.

8. A process of producing pulp which comprises subjecting a cellulosic material to a partial cooking treatment, by digesting the same in a solution of a normal salt of an alkali-forming metal, such salt being derived from an acid which is stable at the temperature of the digesting operation, continuing this treatment until the cementitious matter is rendered readily friable, but not until the said materials has been reduced to a pulp, the digestion being at a temperature sufficient to produce a caramel odor in the liquid, and under a pressure of about 80 to 120 lbs., soaking the cooked material in cool water, and thereafter reducing the material to a pulp by mechanical treatment.

9. A process which comprises cooking woody material in a solution containing about 1 to 5% of common salt and smaller amounts of chlorids or sulfates of bivalent alkaline earth metals, until the cementitious matter is rendered friable, but not long enough to reduce the material to a pulp, soaking the cooked product in water, and mechanically reducing the same to a pulp.

10. A process which comprises cooking woody material in a solution containing about 1 to 5% of common salt and smaller amounts of salts of metals of the second group of the periodic classification, until the cementitious matter is rendered friable, but not long enough to reduce the material to a pulp, soaking the cooked product in water, and mechanically reducing the same to a pulp.

11. A process which comprises cooking woody material in a solution containing about 1 to 5% of common salt and also containing metal sulfates, until the cementitious matter is rendered friable, but not long enough to reduce the material to a pulp, soaking the cooked product in water, and mechanically reducing the same to a pulp.

In testimony whereof I affix my signature.

ROBERT A. MARR.